F. E. RICE.
TAP ATTACHING DEVICE.
APPLICATION FILED NOV. 13, 1919.
1,386,949.
Patented Aug. 9, 1921.
2 SHEETS—SHEET 1.
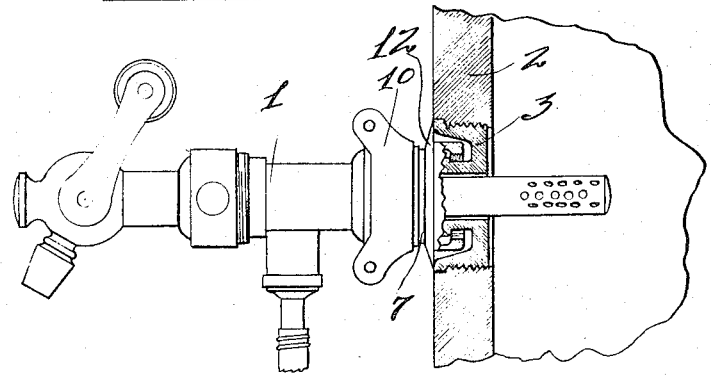
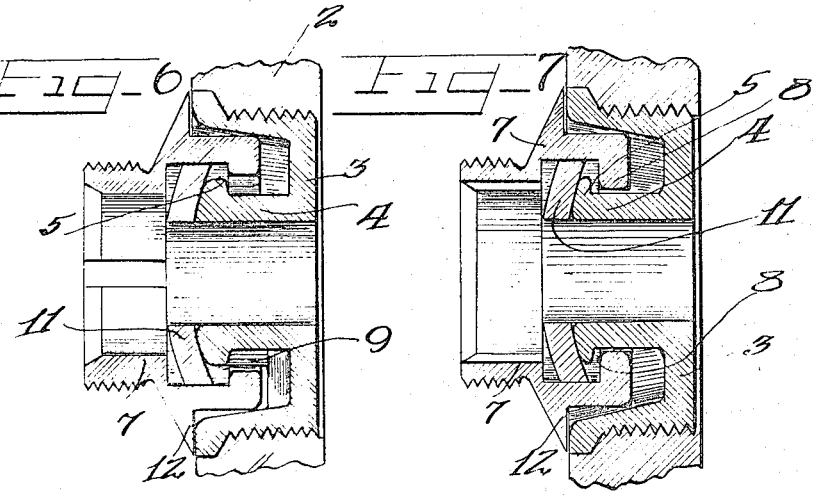
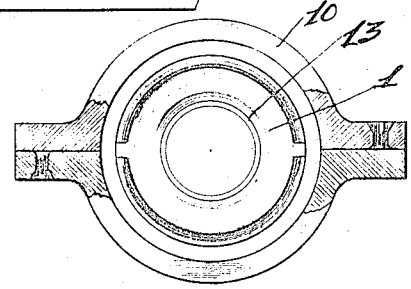
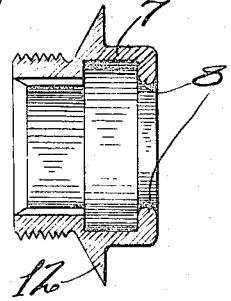
Witnesses
Inventor
Frank E. Rice

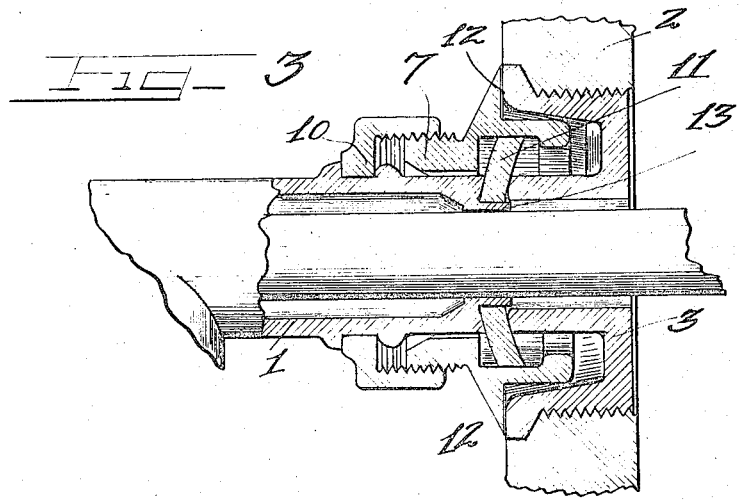
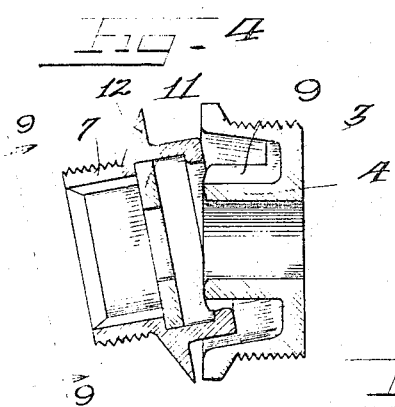
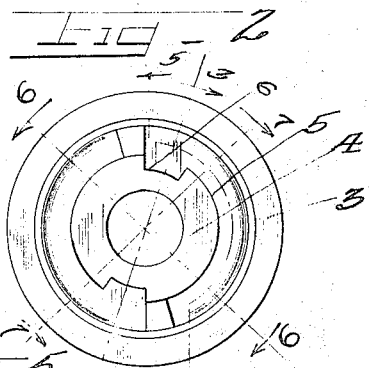

UNITED STATES PATENT OFFICE.

FRANK EDWARD RICE, OF DETROIT, MICHIGAN, ASSIGNOR TO AMERICAN TAP BUSH CO., OF DETROIT, MICHIGAN, A CORPORATION OF MICHIGAN.

TAP-ATTACHING DEVICE.

1,386,949.　　　　Specification of Letters Patent.　　Patented Aug. 9, 1921.

Application filed November 13, 1919.　Serial No. 337,715.

*To all whom it may concern:*

Be it known that I, FRANK E. RICE, a citizen of the United States, and a resident of the city of Detroit, in the county of Wayne and State of Michigan, have invented certain new and useful Improvements in Tap-Attaching Devices; and I do hereby declare that the following is a full, clear, and exact description of the same, reference being had to the accompanying drawings, and to the numerals of reference marked thereon, which form a part of this specification.

This invention has reference more particularly to a tap attaching device for connecting a tap or the like to a keg or container.

It is an object of the invention to provide an improved form of device for connecting a tap or the like to a keg or container.

Another object of the invention is to provide a tap and a bung-hole plug with opposing spherical faces adapted to conjunction with an intervening washer or gasket to provide a tight joint whether the parts are in accurate alinement or not.

Other and further important objects of this invention will be apparent from the disclosures in the drawings and specification.

The invention (in a preferred form) is illustrated in the drawings and hereinafter more fully described.

On the drawings:—

Figure 1 is a side view partly in section of a detachable beer tap mounted for use, and embodying my invention.

Fig. 2 is a front view of the bung-hole plug with other parts removed.

Fig. 3 is a section on the line 3—3 of Fig. 2.

Fig. 4 is a section on the line 3—3 of Fig. 2 looking in the opposite direction to the arrows.

Fig. 5 is a section on the line 5—5 of Fig. 2.

Fig. 6 is a section on the line 6—6 of Fig. 2.

Fig. 7 is a section on the line 7—7 of Fig. 2.

Fig. 8 is an end view looking toward the top of the end of the tap and the union with parts removed.

Fig. 9 is an end view of the thimble taken on the line 9—9 of Fig. 4.

Fig. 10 is a section on the line 10—10 of Fig. 9.

Fig. 11 is an end view of the opposite end of the thimble to that shown in Fig. 9.

As shown in the drawings:—

The invention is illustrated in connection with a tap 1 of well known construction. As shown the device is attached to a cask or keg 2, by means of a bung-hole plug 3 threaded into the bung-hole of the keg.

Centrally arranged in this plug 3 is a cylindrical extension 4 having a laterally projecting flange 5 at its outer end provided with diametrically opposite cutaway portions 6.

For engagement with this extension 4 of the plug is provided a tap attaching thimble 7 having at its end diametrically opposite inwardly directed projections 8 (Fig. 11) adapted to pass through the cutaway portions 6 of the flange of the plug. The parts just described provide a bayonet form of connection between the thimble 7 and the plug 3. Extending downwardly from the flange 5 of the plug 3 are ribs 9 located immediately to one side of the cutaway portions 6 to stop the rotation of the thimble in the plug as soon as the projections 8 of the thimble register with the cutaway portions 6 so that the thimble may then be withdrawn without further adjustments or delay.

Rotatably mounted on the end of the tap 1 is a union 10 adapted to screw onto the outside of the thimble 7. The end of the tap is arranged to project into the thimble so as to compress a washer or packing rim 11 of substantially spherical form, against the end of the cylindrical extension 4 of the bung plug as shown more particularly in Fig. 3.

In order that the washer may make a tight seal the opposing surfaces of the end of the tap and the end of the cylindrical extension 4, of the plug are preferably spherical in form. With such a construction the parts will give a water-tight joint even if they are not in accurate alinement. The parts are, however, held in approximate position by the engagement of the flange 12 of the thimble and the outer part of the plug 3 and also by the extension 13 of the end of the tap which passes through the washer 11 and enters the bore of the cylindrical extension 4 of the plug.

The operation is as follows:—

The washer 11 is first placed in position in the thimble and the latter is then brought into engagement with the plug as indicated in Fig. 4. After the projections 8 of the thimble have been passed through the cutaway parts 6, the thimble is turned to bring the projections under the flange 5 of the plug. Next the end of the tap is inserted into the thimble and the union 10 tightened to force the end of the tap against the washer. The connection of the tap to the keg is then complete.

I am aware that numerous details of construction may be varied through a wide range without departing from the principles of this invention, and I therefore do not purpose limiting the patent granted otherwise than necessitated by the prior art.

I claim as my invention:—

1. A device of the type set forth comprising a bung-hole plug, a nipple in the plug having a spherically formed convex end, a thimble having a bayonet connection with said nipple, a tap having a concave spherically formed end adapted to rotatably enter said thimble, a packing ring between the end of the nipple and the end of the tap and means for producing relative movement between the tap and the thimble to produce compression of the packing ring between the parts engaging such ring.

2. A device of the type set forth comprising a bung-hole plug, a thimble having a bayonet connection with said plug, a tap having an end adapted to enter said thimble, a packing ring in the form of a section of a hollow sphere between the end of the plug and the end of the tap and means for producing relative movement between the tap and the thimble to produce compression of the packing ring between the parts engaging such ring, the ends of the plug and the end of the tap having their surfaces in substantially corresponding spherical sections, whereby a tight joint is maintained whether the parts are in accurate alinement or not.

3. A device of the type set forth comprising a bung hole plug, a thimble having a bayonet connection with said plug, means for limiting the rotation of the thimble in the plug to aid the connection and disconnection of these parts, a tap having an end adapted to enter said thimble, a packing ring in the form of a section of a hollow sphere between and interfitting with the end of the plug and the end of the tap and means for producing relative movement between the tap and the thimble to produce compression of the packing ring between the parts engaging such ring.

4. A tap attaching device including a bung-hole plug, an upstanding nipple in the plug, the surface of the rim of said nipple being a spherical section, a thimble having a bayonet connection with said nipple, a tap adapted to rotatably fit into said thimble and having an offset end, one portion of which fits into the nipple, and the overhanging edge of which is shaped to correspond with the rim of said nipple, and means adjustably connecting the tap to the thimble.

In testimony whereof I have hereunto subscribed my name in the presence of two subscribing witnesses.

FRANK EDWARD RICE.

Witnesses:
GEORGE STROH, Jr.,
JOHN HOFFMEISTER.